United States Patent [19]

Kinaga et al.

[11] Patent Number: 4,615,551
[45] Date of Patent: Oct. 7, 1986

[54] APPARATUS FOR POSITIONING THE BACKREST OF A VEHICLE SEAT

[75] Inventors: Eiichi Kinaga, Toyota; Masanori Sakai, Fujisawa; Masaaki Tanno, Hino, all of Japan

[73] Assignees: Toyota Jidosha Kabushiki Kaisha; Shiroki Kinzoku Kogyo Kabushiki Kaisha, both of Japan

[21] Appl. No.: 625,124

[22] Filed: Jun. 27, 1984

[30] Foreign Application Priority Data

Jun. 28, 1983 [JP] Japan .............................. 58-98828[U]

[51] Int. Cl.⁴ ................................................ A47C 1/02
[52] U.S. Cl. ..................................... 297/341; 248/429
[58] Field of Search ....................... 297/341, 354, 379; 248/429, 430

[56] References Cited

U.S. PATENT DOCUMENTS

| | | | |
|---|---|---|---|
| 2,856,983 | 10/1958 | Probst et al. | 297/341 |
| 3,931,995 | 1/1976 | Arai | 297/341 |
| 4,143,911 | 3/1979 | Sakakibara et al. | 297/341 |
| 4,423,904 | 1/1984 | Crawford | 297/341 |

FOREIGN PATENT DOCUMENTS

| | | | |
|---|---|---|---|
| 2724048 | 12/1978 | Fed. Rep. of Germany | 297/341 |
| 2378649 | 9/1978 | France | 297/341 |
| 885086 | 11/1981 | U.S.S.R. | 297/341 |

Primary Examiner—Peter A. Aschenbrenner
Attorney, Agent, or Firm—Finnegan, Henderson, Farabow, Garrett & Dunner

[57] ABSTRACT

An apparatus for positioning the backrest of a vehicle seat to facilitate an occupant's entry and exit from the vehicle. The apparatus includes a seat frame mounted on the floor of a vehicle and a backrest frame pivotally connected to the seat frame. A pawl member releasably engages the seat frame from teeth on the backrest frame and is controlled by an operating lever to adjust the pivotable position of the backrest. A support member slidably positions the seat frame along the vehicle and includes a pair of spaced lower rails and a pair of complimentary upper rails slidably mounted on the lower rails. A locking device mounted on the upper rail prevents sliding movement between the upper and lower rails. A cable means extending between the backrest and the locking device releases the locking device to enable sliding movement between the upper and lower rails when the backrest is pivoted beyond a predetermined position. The backrest, which is biased toward the front of the vehicle, cannot be pivoted back to its original position until a positioning lever engages a cam surface mounted on the lower rail to disengage a restricting arm engaged within a groove on the backrest.

8 Claims, 19 Drawing Figures

APPARATUS FOR POSITIONING THE BACKREST OF A VEHICLE SEAT

BACKGROUND OF THE INVENTION

1. Field of the Invention

This invention relates to an apparatus for pivoting a front seat of a two-door automobile forward, so that the backrest is tilted forward when someone steps into or out of the rear seating compartment.

2. Description of the Prior Art

Figures 1, 2:
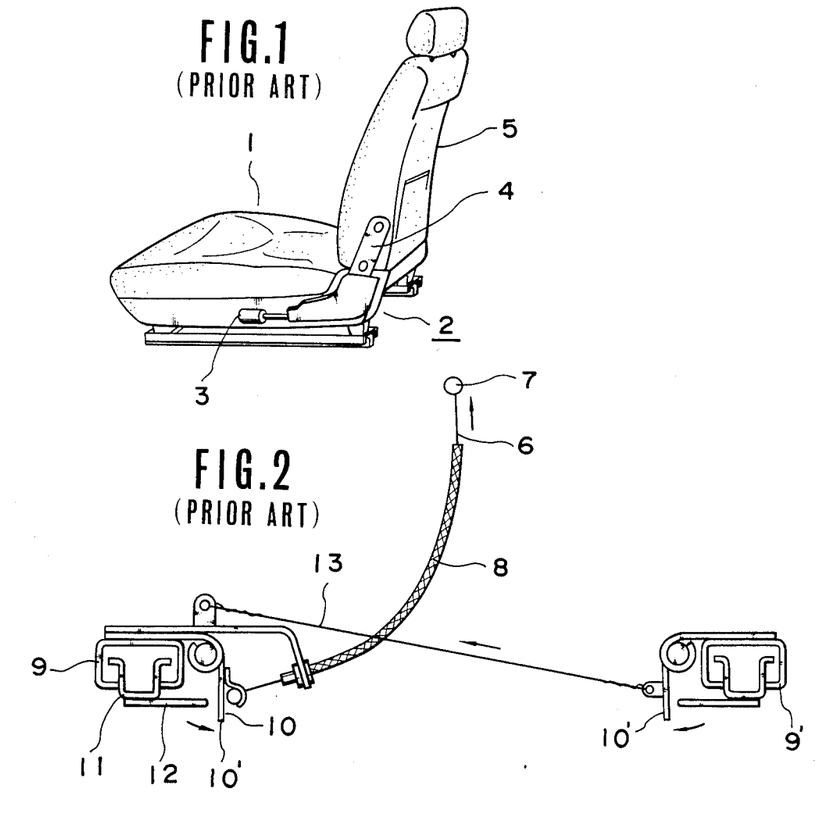
FIG. 1 is a perspective view of a front seat.
FIG. 2 is a detailed front view of a conventional walk-in apparatus.

As is well known, the front seat 1 of a two-door automobile has a backrest adjusting apparatus 2, as shown in FIG. 1, which makes it easy for passengers to reach the rear seats.

When a inclining handle 3 at the side of the front seat 1 is pulled up, a catch disengages from a ratchet (not shown) of an upper arm 4, so that a backrest 5 thereof tilts forward. This tensions a base end 7 of a cable 6, shown in FIG. 3, connected to the upper arm 4. As a result, the cable 6, guided through the outer cable 8, pulls and rotates upward a lock lever 10 of which the upper end is pivoted about one of a pair of upper rails 9 of seat tracks that support the seat 1. This in turn separates a hook 10' of the lock lever 10 from a notch 12' in a lock plate 12 which is secured to one of the lower rails on which the upper rail 9 slides.

Figure 3:
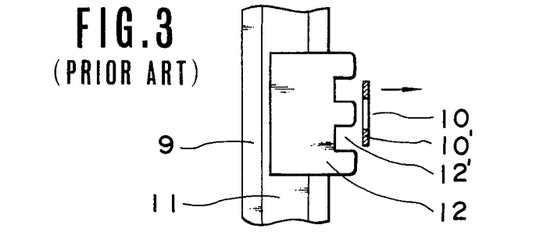
FIG. 3 is a plan view of part of the apparatus.

At the same time, another lock lever 10' attached to the other upper rail 9' paired with the first rail 9 also is rotated by the lock lever 10 together with a relay cable 13.

The seat 1 can then be slid forward by the tension of helper springs (not shown) along the upper rails 9, 9'.

In a seat provided with a walk-in apparatus 2 of this kind, for safety's sake, the backrest 5 is locked in the tilted position by a locking mechanism (not shown) to prevent anyone sitting on the front seat while the seat is in the "walk-in" position.

In the conventional walk-in apparatus, even though the backrest is locked when in the "walk-in" position, unlocking of the backrest is not necessarily limited to when the seat is slid back to a "slide-lock" position. This results in the disadvantage that, when the automobile moves off suddenly with someone sitting in the front seat, the seat could move backward because the upper rails are in sliding engagement with the lower rails.

This problem can be overcome by releasing the lock of the seat back at the seat "slide-lock" position when the seat is being slid back.

It would be safer if the seat back could be locked when it is tilted forward and the seat is advanced even a short distance from the "slide-lock" position.

However, since in a conventional walk-in apparatus the position of the slide-lock provided by the notch 12' in the lock plate 12 and the hook 10' of the lock lever 10 is restricted to only one point, it is very difficult to make the "slide-lock" position, at which the seat is locked it has been slide back, match exactly the "backrest-lock" position, because of machining errors and assembly errors.

Even if a correct setting is obtained at which the "slide-lock" position and the "back-lock" position match, the setting could shift with time because of vibration and other causes.

SUMMARY OF THE INVENTION

An object of the present invention is to provide an improved walk-in apparatus for an automobile seat which will aid the use of the seats of a two-door automobile. The walk-in apparatus of this invention solves the problems experienced in conventional apparatuses, and is characterized in that the lock position can be set easily, the backrest is locked even when the seat is moved forward only a small distance beyond the slide-lock position with the seat back tilted, the seat back-lock is released only at the slide-lock position when the seat is moved back, and the pair of lock levers can be rotated simultaneously with a light pull on one lever.

DESCRIPTION OF THE PREFERRED EMBODIMENT

Figures 4, 6:
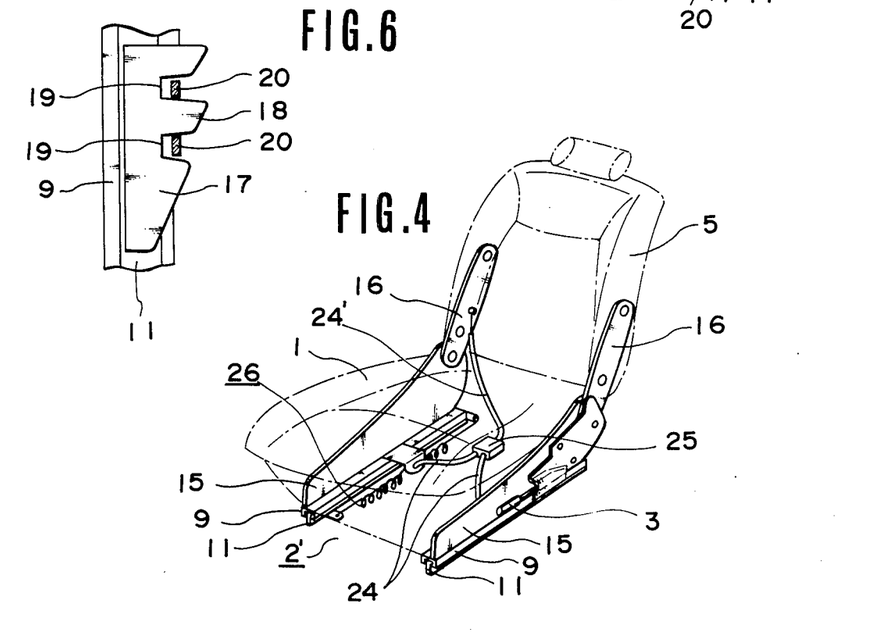
FIG. 4 is a perspective view of one embodiment according to the present invention.
FIG. 6 is a plan view of part of the apparatus.

Reference numeral 1 denotes a front seat installed in a two-door automobile and which is provided with a walk-in apparatus 2' that constitutes this invention. The walk-in apparatus 2' consists of a pair of parallel lower rails 11 rigidly secured by brackets 14 to a vehicle floor 13. A pair of upper rails 9 are slidably mounted on the lower rails 11. Lower arms 15, each of which has an upper arm 16 pivotably supported on a rear part thereof, are rigidly mounted on the upper rails 9.

The seat 1 is rigidly mounted on the lower arms 15, and the backrest 5 is secured to the upper arms 16.

A pair of lock plates 17 are secured to the base of each of the lower rails 11. The inner edge 18 of each of the lock plates 17 is tapered, as shown in FIG. 6, so as to engage a lock lever 21 along two parallel notches 19, which are cut in each inner edge 18, as viewed together in FIGS. 5 and 6.

Figure 5:
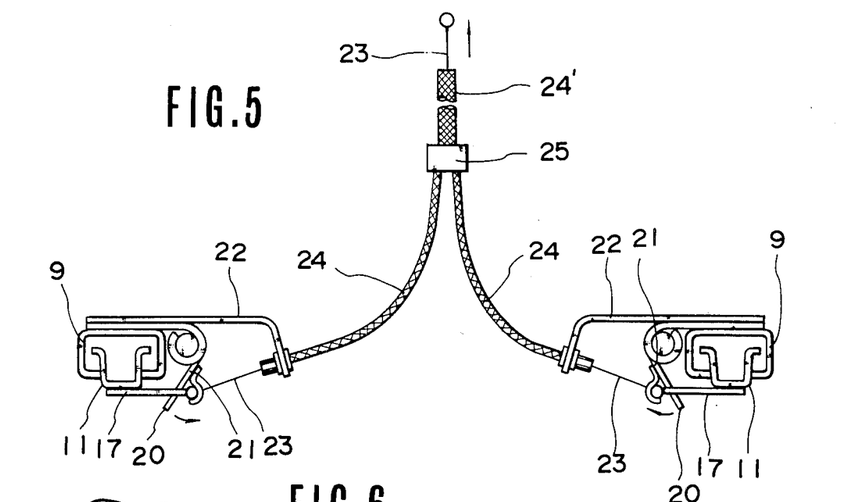
FIG. 5 is a front view of an essential part of the apparatus of this invention.

The free end of each lock lever 21 is provided with teeth or hooks 20 that can engage with or release from the notches 19. The other end of the lock lever 21 is pivotally mounted on a hinge on the inner side of the top of the corresponding upper rail 11. A cable support 22 is welded to the upper surface of each upper rail 9 so as to overhang the inner edge of the upper rail.

One end of a cable 23 is connected to the rear of the free end of each lock lever 21 and the cable 23 is passed through an outer cable 24 screwed onto each cable support 22. Each cable 23 from the lock levers on each side of the seat are joined together by a branch fitting 25, beyond which the cables 23 are led through an outer cable 24' and are connected to one of the upper arms 16.

The cables 23 have a certain amount of play so that they are tensioned after the upper arms 16 have tilted forward through an angle of rotation $\theta$, as described later.

The front end of a helper spring 26 is secured to one of the lower rails 11, and the base end thereof is secured to the corresponding upper rail 9 so as to bias the upper rail 9 and thus the front seat 1 forward.

Figure 7:
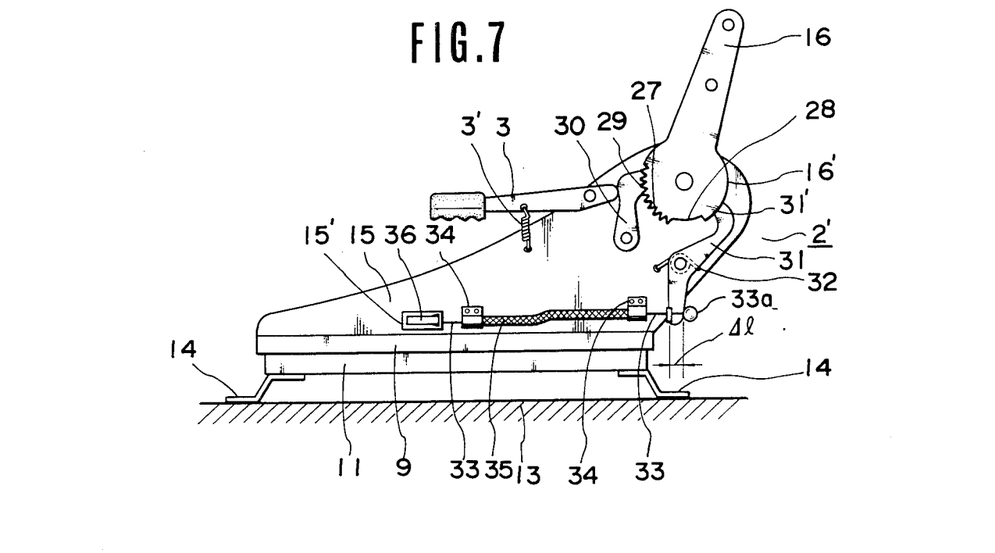
FIG. 7 is a side view of an essential part of the apparatus of FIG. 4.

As shown in FIG. 7, the upper arm 16, which pivots about the lower arm 15, has a ratchet 27 formed along a sector edge around the pivot center in the lower part thereof, and also has a notch 28 spanning a smaller sector formed adjacent to and at the end of the rachet 27.

A catch 30 with a pawl 29, which engages the ratchet 27, is pivotably supported on the lower arm 15 by a pin. The catch 30 is positioned by the end of a reclining handle 3 which is biased by a return spring 3'.

Figure 12:
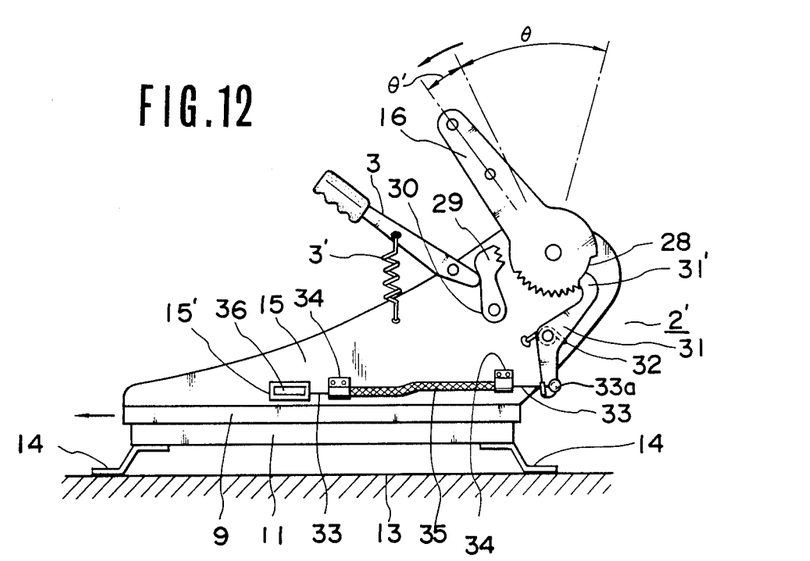

As shown in FIG. 12, the upper end 31' of a lock arm 31, which locks the seat back 5 when it is tilted forward, engages with the notch 28 in the upper arm 16 and also with a large peripheral sector 16' thereof. An intermediate portion of the lock arm 31 is pivotably supported on the lower arm 15 and is biased by a torsion spring 32 so that it comes into contact with the notch 28 or the peripheral sector 16'. A ball 33a attached to the base end of a cable 33 is inserted through the lower end of the lock arm 31 with play of only $\Delta l$ between them.

Figure 8:
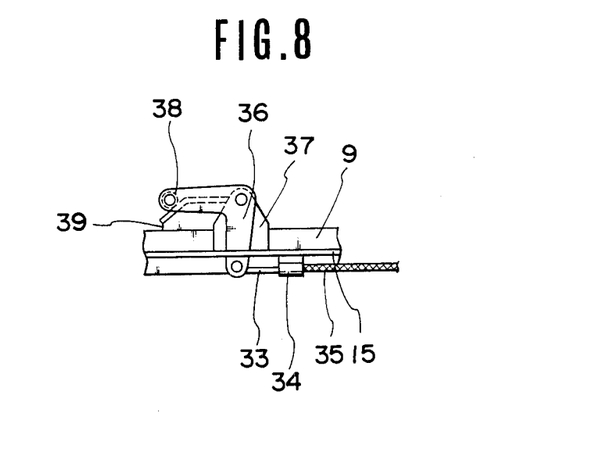
FIG. 8 is a partial plan view of FIG. 7.

The cable 33, as shown in FIGS. 7 and 8, is passed through an outer cable 35 which is supported at both ends by brackets 34 on the lower arm 15. The cable 33 is then led forward and is connected to the base end of an L-shaped longitudinal position-sensing lever 36 supported by a bracket 37 on a foward portion of the lower arm 15.

As shown in FIG. 8, the front end of the longitudinal position-sensing lever 36 is provided with a roller 38 which is rotatably supported thereon.

Longitudinal position-sensing plate 39 acting as a cam which engages the roller 38 projects inward from the lower rail 11.

FIGS. 7 and 8 show the seat when locked in position.

Figure 9:
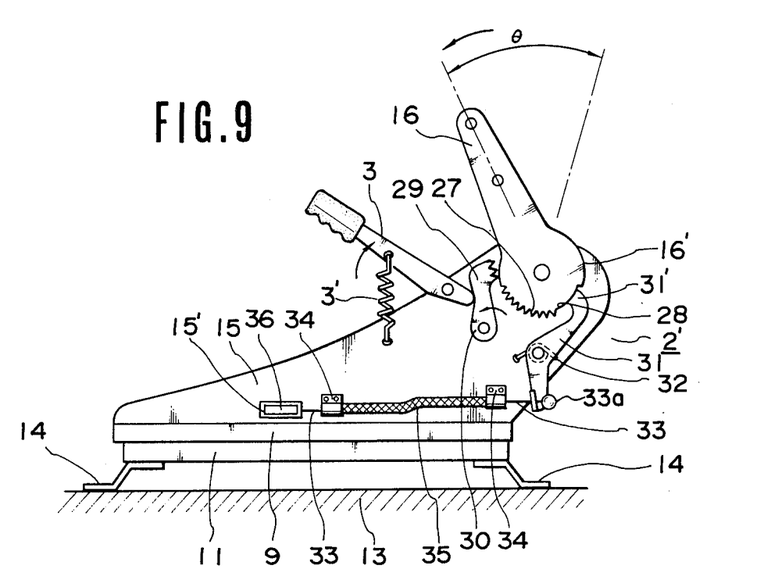
FIGS. 9, 12, and 16 are side views of the operation of the apparatus of FIG. 7.

Referring to FIG. 9, when the reclining handle 3 is rotated upward, releasing the pawls 29 from the ratchets 27 and allowing the upper arms 16 to tilt forward through an angle of rotation $\theta$, the upper ends 31' of the lock arms 31 slide over the peripheral sectors 16' of the upper arms 16 until they fall into the notches 28. The rotational action up to this point is absorbed by the play $\Delta l$ so that the lock arms 31 do not engage an engagement member 33a until the play is taken up.

Each notch 28, as shown in FIG. 12, spans an arc corresponding to the angle of rotation $\theta$ of the upper arm 16.

Figure 16:
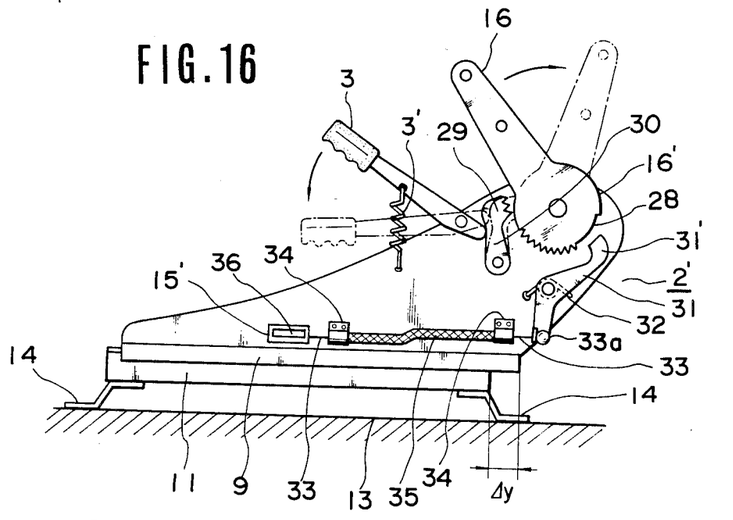

As shown in FIG. 16, the upper rails 9 can be slid back from their normal locked position to a rearmost position at which they overhang the rear ends of the lower rails 11 by the distance $\Delta y$.

In the above construction with the seat locked in position, as shown in FIG. 7, when the reclining handle 3 is rotated upward against the force of the return spring 3' to tilt the backrest 5 to enable someone to step into or out of the rear seating compartment, the pawls of the catches 30 disengage from the ratchets 27 of the upper arms 16, as shown is FIG. 9, so that the backrest 5 can be tilted forward by the action of a return spring (not shown). As the seat back 5 tilts forward, the upper arms 16 rotate through the angle $\theta$.

Figure 10:
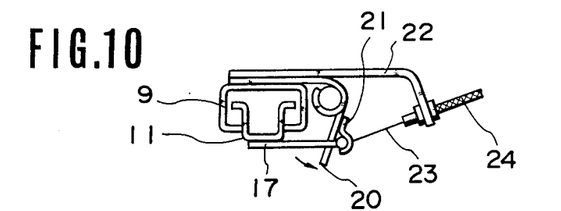
FIGS. 10, 13, and 17 are side views of the operation of parts of the apparatus of FIG. 5.
Figure 11:
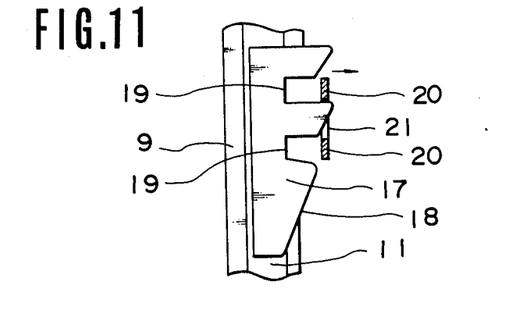
FIGS. 11, 14, and 18 are side views of FIG. 6.

At the same time, when the backrest 5 tilts forward, the upper end 31' of the lock arm 31 slides over the peripheral sector 16' of the upper arm so that it falls into and engages with the notch 28. The lock arm 31 then rotates to absorb the play $\Delta l$ between the lock arm 31 and the cable 33 passing through the lower part of it. The rotational movement of the upper arm 16 pulls the cables 23, turning inward the lock levers 21 attached to each of the upper rails 9 simultaneously, as shown in FIGS. 10 and 11. This makes the hooks 20 of the lock levers 21 slide inward along the notches 19.

At this stage the hooks 20 are still sliding along the notches 19 and have not completely disengaged from the notches 19.

Figure 13:
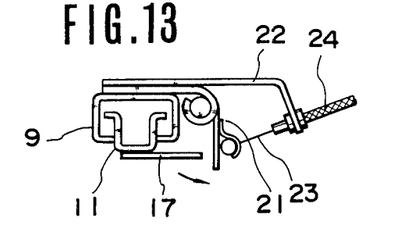
Figure 14:
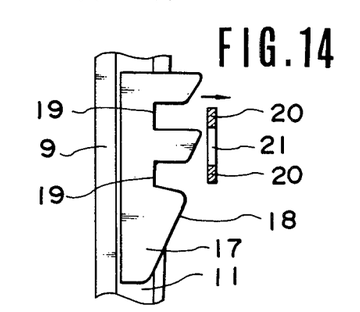

When, as shown in FIG. 12, the backrest 5 and therefore the upper arms 16 are tilted further forward through $\theta'$, the hooks 20 of the lock levers 21 disengage completely from the notches 19 in the lock plates 17, as shown in FIGS. 13 and 14, releasing the slide-lock of the seat.

As a result, the upper rails 9 are moved forward by the tension of the helper springs 26.

Figure 15:
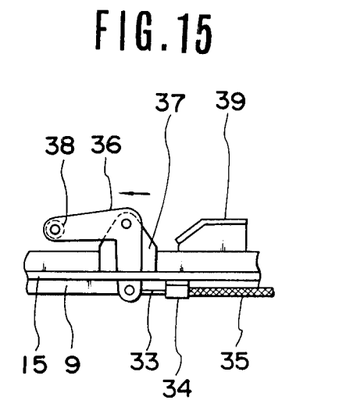
FIGS. 15 and 19 are plan views of FIG. 8.

Since the upper ends 31' of the lock arms 31 slide over the arc of the notches 28 without any movement, the cables 33 are not pulled. The step portion between the notch 28 and the peripheral sector 16' of each upper arm 16 prevents the reverse movement of the arms 16 into the $\theta$ area by resting against the upper end 31' of the corresponding lock arm 31. This locks the backrest. At the same time each lever 36 separates from its cam 39, as shown in FIG. 15.

In this way, if the front seat 1 is moved forward even through a small distance with the backrest 5 tilted, the backrest 5 is locked to prevent anyone sitting on that seat.

When the backrest 5 is moved back by hand from its forward position, the upper rails 9 are retracted against the force of the helper springs 26 until they hit stoppers (not shown) and overhang the rear ends of the lower rails 11 by $\Delta y$, as shown in FIG. 16.

Figure 17:
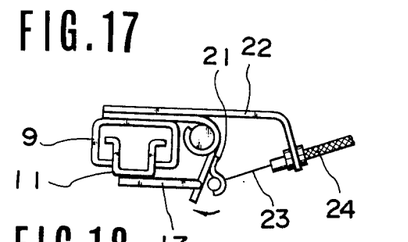
Figure 18:
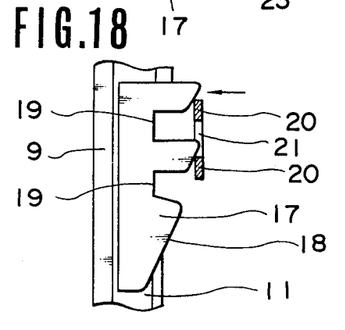

During this process, the upper arms 16 are rotated back through the angle $\theta'$ from the condition shown in FIG. 12 to assume the position shown in FIG. 9, and the lock levers 21 are returned by a quantity corresponding to that reverse rotation of the upper arms 16 so that the hooks 20 are guided along the tapered edges 18 of the lock plates 17, as shown in FIGS. 17 and 18. At this stage, however, the hooks 20 do not fully fit into the notches 19 and do not engage with them.

Figure 19:
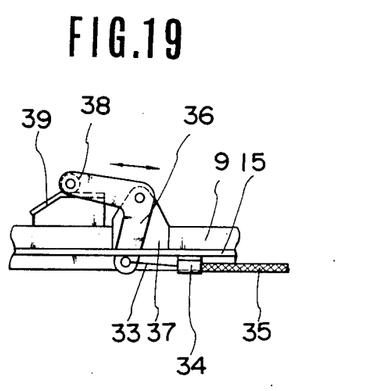

In FIG. 19, each longitudinal position-sensing lever 36 pivots as its roller 38 rides over the cam 39. The pivotal motion of the lever 36 rotates, through the cables 33, the lock arms 31 clockwise against the force of the springs 32, making them disengage from the notches 28 in the upper arms 16.

As viewed particularly in FIGS. 16-19, the clockwise motion of the lever 36 pulls the cable 33 slightly forward to take up the play, shown as $\Delta l$ in FIG. 7, which exists between the lock arm 31 and the engagement member 33a. When the play is taken up the engagement member 33a rotates the lock arm 33 clockwise, so that the upper end 31' is disengaged from the notch 28. As shown in FIGS. 16 and 19, the roller 38 rides over the cam 39 to pivot lever 36 when the upper rail 9 overhangs the lower rail by the distance $\Delta y$.

The upper arms 16 and, therefore, the backrest 5 are then unlocked, so that the backrest 5 can be returned to its normal desired upright position by hand. As the backrest is returned to its normal position, the cables 22 slacken.

When the retracting force is released, the upper rails 9 are moved forward by the tensioned helper springs 26, guiding the hooks 20 along the tapered edges 18 of the lock plates 17 into engagement with the notches 19. As a result, the seat is locked in its initial locked position.

In the meantime, each longitudinal position-sensing lever 36 disengages from the corresponding plate 39, retracting the cable 33 and allowing the lock arm 31 to be returned into contact with the peripheral sector 16' of the corresponding upper arm 16 by the return spring 32. The reclining handle 3 is then returned to its original position by the spring 3', and the catches 30 also return into engagement with the ratchets 27.

Therefore, when the front seat 1 is slid back from the "walk-in" position, the seat is locked only when it is in the predetermined "slide-lock" position.

If the seat is at its rearmost position and the upper arms 16 are not completely returned, and an attempt is made to shake the backrest 5, the seat is prevented from moving forward because the hooks 20 are slightly engaged with the upper parts of the notches 19. If the seat back 5 is tilted halfway through the angle θ, as shown in FIG. 9, the seat slide-lock is not released, preventing the seat from moving forward.

It must be noted that the invention is not in any way limited to the above embodiment alone, various modifications can be made thereto.

The walk-in apparatus of the present invention has the following advantages.

Since the seat slide-lock at the predetermined position is effective only after the upper rails have slid back to their rearmost position overhanging the lower rails and are then advanced by the helper spring, the seat can be safely locked in position so long as any error in the relative engagement positions of the upper and lower rails due to machining or assembly errors is within the overhang distance. This not only eliminates the need for adjustment, facilitating both manufacture and assembly, but also improves the quality of the apparatus.

Another feature of the walk-in apparatus of the present invention is that when the seat is slid back from the "walk-in" position, the backrest is unlocked only when it reaches a "slide-lock" position. The seat can also be locked when it is moved forward through even a small distance with the backrest tilted. When the seat back is upright, the seat cannot be moved backward or forward. This ensures the safety of the front-seat passenger when the car is started suddenly.

Since the hooks of the lock levers attached to the upper rails slide along the tapered edges into the notches in the lock plates secured to the seat tracks when the seat is being moved to its rearmost position at which the upper rails overhang the seat tracks, the seat, if inadvertently pushed forwarded, will be locked in its predetermined position by the hooks engaging with the notches, thereby preventing the seat moving forward.

What is claimed is:

1. An apparatus for positioning the backrest of a vehicle seat to facilitate an occupant's entry and exit from a vehicle, which comprises:
   a seat frame mounted on a vehicle floor;
   a backrest frame pivotally connected to said seat frame;
   engagement means for releasably engaging said seat frame and said backrest frame;
   lever means for controlling said engagement means to adjust the pivotal position of said backrest;
   support means for slidably positioning said seat frame along said vehicle floor, said support means including a pair of spaced lower rails, a pair of complimentary upper rails, and means for slidably engaging said upper and lower rails, at least one of said lower rails having a cam surface;
   locking means attached to said support means for normally preventing sliding movement between said upper and lower rails;
   first cable means extending between said backrest and said locking means for releasing said locking means to enable sliding movement between said upper and lower rails, wherein pivoting of said backrest frame beyond a predetermined angle in a first direction allows said first cable means to release said locking means by movement of said lever means;
   biasing means for biasing said seat frame toward the front of the vehicle;
   restricting means pivotally attached to said seat frame for engaging said backrest to restrict substantial movement of said backrest frame after pivoting of said backrest frame beyond said predetermined angle; and
   control means for disengaging said restricting means to pivot said backrest frame opposite said first direction after sliding said seat frame a predetermined distance against the force exerted by said biasing means, said control means including a positioning lever having a pair of arms and pivotally mounted on at least one of said upper rails, one of said arms having roller means for slidably engaging said cam surface, said control means also including second cable means extending between the remaining one of said arms and said restricting means, wherein said roller means engages said cam surface in response to rearward movement of the seat said predetermined distance against the force exerted by said biasing means, to pivot the remaining one of said arms enabling said second cable means to disengage said restricting means from said backrest frame.

2. The apparatus defined in claim 1, wherein said engagement means includes a series of teeth extending along the base of said backrest frame and a pawl member pivotally mounted on said seat frame, and wherein said lever means releasably positions said pawl member into engagement with said series of teeth.

3. The apparatus as defined in claim 1, wherein said locking means includes a lock plate mounted on said lower rail and having notches, said locking means also including hooked means connected to said first cable means for normal engagement with said notches to lock said upper and lower rails.

4. The apparatus as defined in claim 3, wherein said lock plate includes an end surface extending along a portion of said notches, said end surface being tapered, whereby said hooked means is aligned within said notches adjacent said tapered end surfaces to restrict the sliding movement of said support means when said backrest frame is pivoted to said predetermined angle, while pivoting of said backrest frame beyond said predetermined angle withdraws said hooked means from said notches.

5. The apparatus as defined in claim 1, wherein said restricting means includes a grooved surface on the base of said backrest adjacent said series of teeth and a locking arm rotatably mounted on said seat frame and biased into contact with said backrest frame, said locking arm having first and second end sections, wherein said first end section is positioned within said grooved surface when said backrest frame is pivoted beyond said predetermined angle to restrict movement of said backrest frame, and wherein said second end section rotatably engages said second cable means in response to the pivotal movement of said backrest frame.

6. The apparatus as defined in claim 1, wherein said predetermined distance is defined to require at least a portion of said seat frame to extend beyond said lower rail.

7. The apparatus as defined in claim 1, wherein said lever means is rotatably mounted on said seat frame and wherein said lever means includes spring means for biasing said lever counterclockwise.

8. An apparatus for positioning the backrest of a vehicle seat to facilitate an occupant's entry and exit from a vehicle, which comprises:

a seat frame mounted on a vehicle floor;

a backrest frame pivotally connected to said seat frame;

engagement means for releasably engaging said seat frame and said backrest frame;

lever means for controlling said engagement means to adjust the pivotal position of said backrest;

support means for slidably positioning said seat frame along said vehicle floor;

locking means attached to said support means for normally preventing sliding movement between said upper and lower rails;

first cable means extending between said backrest and said locking means for releasing said locking means to enable sliding movement between said upper and lower rails, wherein pivoting of said backrest frame beyond a predetermined angle in a first direction allows said first cable means to release said locking means by movement of said lever means;

biasing means for biasing said seat frame toward the front of the vehicle;

restricting means pivotally attached to said seat frame for engaging said backrest to restrict substantial movement of said backrest frame after pivoting of said backrest frame beyond said predetermined angle; and control means for disengaging said restricting means to pivot said backrest frame opposite said first direction after sliding said seat frame a predetermined distance against the force exerted by said biasing means.

* * * * *